United States Patent [19]

Selvig

[11] Patent Number: 5,200,483
[45] Date of Patent: Apr. 6, 1993

[54] POLYOL(ALLYL CARBONATE) COMPOSITIONS AND ARTICLES PREPARED THERE FROM

[75] Inventor: Christopher D. Selvig, Pittsburgh, Pa.

[73] Assignee: PPG Industries, Inc., Pittsburgh, Pa.

[21] Appl. No.: 788,978

[22] Filed: Nov. 7, 1991

[51] Int. Cl.$^5$ ................... C08F 18/24; C08F 283/02
[52] U.S. Cl. ................... 526/301; 526/314; 525/455; 525/920
[58] Field of Search ........... 526/301, 314; 525/455, 525/920

[56] References Cited

U.S. PATENT DOCUMENTS

| | | | |
|---|---|---|---|
| 3,565,814 | 2/1971 | Pellon | 252/300 |
| 4,360,653 | 11/1982 | Stevens et al. | 526/301 |
| 4,613,656 | 9/1986 | Tang | 526/314 |
| 4,637,698 | 1/1987 | Kwak et al. | 430/345 |
| 4,686,266 | 8/1987 | Tang | 526/314 |
| 4,994,208 | 2/1991 | McBain et al. | 252/586 |
| 5,084,529 | 1/1992 | Crano | 525/455 |

FOREIGN PATENT DOCUMENTS 227337 7/1987 European Pat. Off. .
62-11743 1/1987 Japan .

Primary Examiner—Paul R. Michl
Assistant Examiner—Peter Szekely
Attorney, Agent, or Firm—Irwin M. Stein

[57] ABSTRACT

Describes organic resin compositions of from about 30 to 90 weight percent of a polyol(allyl carbonate), e.g., diethylene glycol bis(allyl carbonate), and from about 10 to 70, e.g., 10 to 30, weight percent of a mixture of aliphatic urethanes, the terminal portions of which contain allyl or acrylyl functional groups. Polymerizable compositions prepared from such compositions produce castings which have low yellowness (b*) values and which do not pre-release from the molds in which they are formed. Polymerizates prepared from such compositions may be used to prepare photochromic articles, e.g., lenses, by incorporating a photochromic substance, e.g., by thermal transfer, into the polymerizate.

30 Claims, No Drawings

POLYOL(ALLYL CARBONATE) COMPOSIITONS AND ARTICLES PREPARED THERE FROM

DESCRIPTION OF THE INVENTION

The present invention relates to polymerizable synthetic polyol(allyl carbonate) compositions and articles prepared therefrom, particularly articles having organic photochromic material(s) applied to or incorporated therein. More particularly, the present invention relates to certain polymerizable polyol(allyl carbonate) compositions that contain from about 10 to about 30 weight percent of a mixture of aliphatic urethanes, the terminal (or end) groups of which contain allyl and/or acrylyl unsaturation, and to photochromic articles prepared from polymerizates of such compositions. Depending on the amount and relative quantities of the acrylyl- and allyl-functional groups in the aliphatic urethane components in the polymerizable polyol(allyl carbonate) compositions, the initiated pot life of such compositions may vary from being relatively brief, e.g., 5 hours at 25° C., to a pot life comparable to initiated diethylene glycol bis(allyl carbonate). Articles prepared from such compositions are nearly colorless and do not generally prerelease form the mold in which they are cured, e.g., in a constant temperature water bath. Photochromic articles prepared from such compositions are characterized by an improved photochromic response compared to photochromic articles prepared from a homopolymer of diethylene glycol bis(allyl carbonate).

Photochromism is a phenomenon involving a change in color of a photochromic substance (or an article containing such a substance) when it is exposed to light radiation involving ultraviolet rays, such an ultraviolet radiation contained in sunlight or in the light of a mercury lamp, and a reversion to the original color when the influence of the ultraviolet radiation is discontinued, e.g., by storing the substance (or article) in the dark or removing the source of ultraviolet radiation. In recent years, photochromic plastic materials, particularly plastic materials for optical applications, have been the subject of considerable attention. In particular, photochromic ophthalmic plastic lenses have been investigated because of the weight advantage they offer, vis a vis, glass lenses. Moreover, photochromic transparencies for vehicles, such as cars and airplanes, have been of interest because of the potential safety features that such transparencies offer.

When incorporated within the matrix of a synthetic organic transparency (or applied to a substrate of such matrix), a photochromic substance changes color when exposed to ultraviolet light. This change in color reduces the amount of light transmitted through the transparency. It is desirable that the equilibrium response of the photochromic substance-containing transparency at all normal ambient temperatures, including relatively high ambient temperatures, e.g., temperatures on the order of 95° F. (35° C.), be significant.

It is reported that when a photochromic substance, e.g., a photochromic compound, converts to its colored form by absorption of ultraviolet light radiation, i.e., the so-called coloring reaction, a reverse reaction occurs simultaneously in which the colored form reverts to the colorless (or original color) form as a result of exposure to white light and/or the action of heat, i.e., the so-called bleaching reaction. The rate of bleaching due to heat (thermal fade) increases with increasing temperature. At relatively high ambient temperatures, e.g., 95° F. (35° C.), the rate of thermal fade can become significant and, as a consequence, the photochromic substance does not develop a sufficiently intense color, i.e., the luminous transmission of a transparency at such temperatures is significantly larger than at lower temperatures, e.g., 55°-75° F. (13°-24° C.). Stated conversely, the activated color of the photochromic transparency is lighter at high ambient temperatures than at lower ambient temperatures.

It is reported in U.S. Pat. No. 4,994,208 that photochromic articles, e.g., transparencies, prepared from certain polymerizable polyol(allyl carbonate) compositions exhibit an improved photochromic equilibrium response compared to photochromic articles prepared from homopolymers of a polyol(allyl carbonate), such as diethylene glycol bis(allyl carbonate). This improved equilibrium response is suggested to be observable at temperatures of from 0° F. (−18° C.) to 115° F. (46° C.), e.g., from 30° F. (−1° C.) to 100° F. (38° C.), particularly over the ambient temperature range from about 55° F. (13° C.) to about 95° F. (35° C.). Such improvement in the photochromic response is described to be a result of an improvement in the coloring efficiency, i.e., the efficiency of the so-called coloring reaction, in polymerizates of such polyol(allyl carbonate) compositions.

More particularly, the polyol(allyl carbonate) compositions described in U.S. Pat. No. 4,994,208 comprise a mixture of a major amount of a polyol(allyl carbonate), e.g., diethylene glycol bis(allyl carbonate), and a minor amount of a certain urethane containing ethylenic unsaturation, e.g., acrylyl functional groups, at its terminal ends. Optionally, a small amount of a copolymerizable difunctional monomer, such as allyl methacrylate, may be added to the composition to enhance the hardness of the polymerizate prepared from the polyol(allyl carbonate) composition. The initiated pot life of polyol(allyl carbonate) compositions described in U.S. Pat. No. 4,994,208 is relatively short, which can pose processing difficulties to some manufacturers of cast articles that use such compositions. However, some casters of polyol(allyl carbonate) compositions desire compositions having an initiated pot life which permits two castings a day instead of the one casting a day obtained with diethylene glycol bis(allyl carbonate) or compositions of a similar long initiated pot life.

DETAILED DESCRIPTION OF THE INVENTION

Plastic optical, e.g., ophthalmic, commercial lenses are prepared to a significant extent by polymerizing the polyol(allyl carbonate) monomer, diethylene glycol bis(allyl carbonate), with a free-radical initiator, usually a dialkyl peroxydicarbonate such as diisopropyl peroxydicarbonate, in glass molds. The pot life of a batch of diethylene glycol bis(allyl carbonate)-initiated monomer, i.e., monomer to which an initiating amount of free-radical initiator has been added, is on the order of about 24 hours at 25° C., which provides the manufacturer (caster) of lenses sufficient time to degass, filter and charge the entire batch of initiated monomer to molds before gelling of the monomer occurs.

Diethylene glycol bis(allyl carbonate) compositions described in U.S. Pat. No. 4,994,208, i.e., compositions containing an aliphatic polyesterurethane diacrylate, have a pot life, i.e., the time from initiation to gelling, on the order of 5 hours at 25° C. This significantly reduced pot life compared to diethylene glycol bis(allyl carbonate) can result in operating difficulties for the caster. Moreover, it has been found that castings prepared with the diethylene glycol bis(allyl carbonate) compositions of U.S. Pat. No. 4,994,208 may have a noticeable yellow cast, which is not desirable for articles, such as lenses, that are required to be optically clear.

It has now been discovered that polyol(allyl carbonate) compositions that contain minor amounts of a mixture of certain aliphatic urethanes the terminal (or end) groups of which contain allyl and/or acrylyl unsaturation, have an initiated pot life that is longer than 5 hours at 25° C., e.g., even approaching about 24 hours at 25° C., while providing nearly colorless cast articles, such as lenses. Such compositions do not pre-release generally from the molds in which they are cured—a problem that has been observed with certain polyol(allyl carbonate) compositions containing only bis(allyl-terminated) aliphatic urethanes, i.e., such compositions being substantially free of bis(acrylate-terminated)aliphatic urethanes.

In accordance with the present invention, there are provided certain liquid polymerizable polyol(allyl carbonate) compositions comprising a blend of copolymerizable monomeric materials; namely, (1) polyol(allyl carbonate) monomer, e.g., diethylene glycol bis(allyl carbonate), and (2) a mixture of (a) aliphatic urethane(s) having allyl unsaturation in at least one of its terminal groups, and (b) aliphatic urethane(s) having acrylyl unsaturation in at least one of its terminal groups. More particularly, the polymerizable polyol(allyl carbonate) monomer represents from about 70 to about 90 weight percent, preferably from about 75 to 85, particularly about 80 to about 84 weight percent of the copolymerizable composition. The urethane content of the blend (and the resulting polymerizate) will vary with the amount of aliphatic polyurethane(s) used. To avoid yellowing of castings as a result of a post-casting heat treatment, it is preferred that the urethane content of the blend of copolymerizable monomeric materials be in the range of from about 3.9 to about 4.9 percent.

Polyol(allyl carbonate) monomers that may be used in the aforedescribed polymerizable composition are allyl carbonates of linear or branched aliphatic or aromatic liquid polyols, e.g., aliphatic glycol bis(allyl carbonate) compounds, or alkylidene bisphenol bis(allyl carbonate) compounds. These monomers may be described as unsaturated polycarbonates of polyols, e.g., glycols. The monomers may be prepared by procedures well known in the art, e.g., as described in U.S. Pat. Nos. 2,370,567 and 2,403,113.

Polyol(allyl carbonate) monomers may be represented by the graphic formula:

R'—[—O—C(O)—O—R]$_m$    I wherein R is the radical derived from an unsaturated alcohol and is commonly an allyl or substituted allyl group, R' is the radical derived from the polyol and m is a whole number from 2-5, preferably 2. The allyl group may be substituted at the 2-position with a halogen, most notably chlorine or bromine, or an alkyl group containing from 1 to 4 carbon atoms. Generally the alkyl substituent is a methyl or ethyl group. The allyl group may be represented by the graphic formula:

                                                        II wherein $R_o$ is hydrogen, halogen or a $C_1$-$C_4$ alkyl group. Most commonly, $R_o$ is hydrogen and consequently R is the allyl group, $H_2C=CH-CH_2-$.

R' is a polyvalent radical derived from the polyol which can be an aliphatic or aromatic polyol that contains 2, 3, 4 or 5 hydroxy groups. Typically, the polyol contains 2 hydroxy group, i.e., a glycol or bisphenol. The aliphatic polyol may be linear or branched and contains from 2 to 10 carbon atoms. Commonly, the aliphatic polyol is an alkylene glycol having from 2 to 4 carbons atoms or poly($C_2$-$C_4$) alkylene glycol, e.g., ethylene glycol, propylene glycol, trimethylene glycol, tetramethylene glycol, or diethylene glycol, triethylene glycol, etc.

Specific examples of polyol(allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propane diol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate). Diethylene glycol bis(allyl carbonate) is the preferred polyol(allyl carbonate) monomer.

A detailed description of polyol(allyl carbonate) monomers that may be used to form the polyol(allyl carbonate) composition of the present invention is found in U.S. Pat. No. 4,637,698 at column 3, line 33 through column 5, line 61. That disclosure is hereby incorporated by reference and is summarized above. As used in the present description and claims, the term polyol(allyl carbonate) monomer or like names, e.g., diethylene glycol bis(allyl carbonate), are intended to mean and include the named monomer or prepolymers thereof and any related monomer or oligomer species contained therein.

The polymerizable polyol(allyl carbonate) composition of the present invention may contain from about 10 to about 30, e.g., 15 to 25, weight percent of a mixture of aliphatic urethane(s), the terminal (or end) groups of which contain ethylenic unsaturation in the form of allyl and/or acrylyl functional groups. When prepared in a concentrated form, the polyol(allyl carbonate) composition may contain up to 70 weight percent, e.g. 10 to 70 weight percent, of the mixture of aliphatic urethane(s). The mixture of aliphatic urethanes contemplated herein include a mixture of aliphatic urethanes, some of which contain (a) bis(allyl) unsaturation, some of which may contain (b) bis(acrylyl) unsaturation, and some of which contain (c) monoallyl-monoacrylyl unsaturation, i.e., an aliphatic urethane containing one terminal group having an allyl functional group and the other terminal group having an acrylyl functional group.

It is particularly contemplated herein that the polymerizable polyol(allyl carbonate) composition of the present invention used to prepare castings contain from about 16 to about 20 weight percent of a mixture of aliphatic urethanes selected from a mixture of:

MIXTURE A 1. at least one aliphatic urethane having allyl unsaturation in both end groups, and 2. at least one aliphatic urethane having allyl unsaturation in one end group and acrylyl unsaturation in the other end group, or

MIXTURE B 1. at least one aliphatic urethane having allyl unsaturation in both end groups, 2. at least one aliphatic urethane having acrylyl unsaturation in both end groups, and 3. at least one aliphatic urethane having allyl unsaturation in one end group and acrylyl unsaturation in the other end group.

More particularly, the terminally-unsaturated aliphatic urethanes comprising the mixture of aliphatic urethanes in the polyol(allyl carbonate) composition may be represented by the expressions:

| D-B-A-B-D   | III-1 |
| D-B-A-B-D'  | III-2 |
| D'-B-A-B-D' | III-3 | wherein D represents the terminal functional group containing allyl unsaturation, D' represents the terminal functional group containing acrylyl unsaturation and B represents an aliphatic bis carbamic moiety that originates from the corresponding aliphatic diisocyanate. Group B in the foregoing graphic expressions may be represented herein by the formula, —OC(O)—NH—(E)NH—C(O)—O—, wherein E is the aliphatic (or cycloaliphatic) residue of the aliphatic diisocyanate.

Group A in the foregoing graphic expressions represents the residue of a saturated aliphatic polyol, e.g., diol, such as a $C_2$-$C_6$ alkane diol, diethylene glycol, a polyether diol, a polycarbonate diol or a polyester diol, i.e., the residue remaining after removal of the hydroxyl groups from the polyol, e.g., diol. For example, when the polyol is butane diol, A in the foregoing graphic expressions may be represented by the formula, —CH$_2$—CH$_2$—CH$_2$—CH$_2$—(or —(CH$_2$)$_4$—). Preferably, A is the residue of a polyester diol, diethylene glycol, or $C_2$-$C_6$, e.g., $C_2$-$C_4$, alkane diol, e.g., butane diol.

Since Group A may represent an aliphatic polyol selected from the foregoing described groups, it is evident from the aforedescribed embodiments of MIXTURE A and MIXTURE B that component A in the expressions III-1 - III-3 may be the same or different for each of the aliphatic urethanes comprising the polyol(allyl carbonate) composition. For example, the mixture of aliphatic urethanes may comprise two or more materials represented by expression III-1 wherein component A in each material is different. More particularly, these materials may be represented by the expressions,

| D-B-A'-B-D    | III-4 |
| D-B-A"-B-D    | III-5 |
| D-B-A'-B-D'   | III-6 |
| D'-B-A"-B-D'  | III-7 |
| D'-B-A'-B-D'  | III-8 |
| D'-B-A"-B-D'  | III-9 | wherein A' and A" are each the residue of a saturated aliphatic polyol selected from the group consisting of a $C_2$-$C_6$ alkane diol, diethylene glycol, a polyether diol, a polycarbonate diol or a polyester diol. In one particular embodiment A' is the residue of a polyester diol and A" is the residue of a $C_2$-$C_6$ alkane diol.

Other embodiments are also contemplated wherein different polyol residues, e.g., A''' or A'''', may be used in combination with those hereinbefore described. Moreover, the aliphatic diisocyanate from which component B in the foregoing expressions is derived also may be the same or different for the aliphatic urethanes used in the mixture. For example, there may be components B', B'', etc. that may be used in combination with components A', A'', etc. and/or D and D' in various combinations and permutations.

In particularly preferred embodiments, the mixture of aliphatic urethanes includes either (1) a bis(allyl-terminated) polyesterurethane, a bis(allyl-terminated) urethane derived from a $C_2$-$C_6$ alkane diol, a polyesterurethane having an allyl-containing terminal functional group and an acrylyl-containing terminal functional group, and an aliphatic urethane derived from a $C_2$-$C_6$ alkane diol having an allyl-containing terminal functional group and an acrylyl-containing terminal functional group; or (2) a bis(allyl-terminated) polyesterurethane, a bis(acrylyl-terminated) polyesterurethane and a polyesterurethane having an allyl-containing terminal functional group and an acrylyl-containing terminal functional group. Preferably, the polyester diol is a polycaprolactone diol and the $C_2$-$C_6$ alkane diol is butane diol.

In the foregoing aliphatic urethane mixtures, the molar ratio of allyl groups to acrylyl groups may vary from about 15:1 to about 1:1. Usually, the smaller the ratio of allyl to acrylyl groups, the shorter the initiated pot life of the polyol(allyl carbonate) composition containing the mixture of aliphatic urethanes. Further, in such aliphatic urethane mixtures, the molar amount of polyester diol to alkane diol used to prepare such mixtures may vary from about 95:5 to about 70:30, e.g., about 80:20, which corresponds to molar ratios of 19:1 to 2.3:1, e.g. 4:1. The mixture of aliphatic urethanes should form a homogeneous mixture in and be copolymerizable with the polyol(allyl carbonate), e.g., diethylene glycol bis(allyl carbonate), with which it is blended.

The terminal group D in the foregoing expressions contains allyl unsaturation, and is preferably the allyl group, i.e., CH$_2$=CH—CH$_2$—, which originates, for example, from allyl alcohol. The terminal group D', which contains acrylyl unsaturation, may contain acrylyl or methacrylyl unsaturation, i.e., CH$_2$=C(L)—C(O)—, wherein L is hydrogen or methyl. The terminal group D' may also be represented by the expression CH$_2$=C(L)—C(O)—O—M, wherein M is an alkylene group of from 2 to 6 carbon atoms, such as ethylene, e.g., the group derived from 2-hydroxyethyl acrylate or methacrylate. The term "acrylyl", when used in the description and claims in the generic sense, is intended to include "methacrylyl", i.e., when "L" is hydrogen or methyl.

Diisocyanates that may be used to prepare the aliphatic urethane component of the polyol(allyl carbonate) composition are aliphatic diisocyanates, cycloaliphatic diisocyanates and tetramethylene xylene diisocyanate. For convenience and brevity, such isocyanates will be referred to collectively as aliphatic diisocyanates. Such materials are substantially free of aromatic isocyanate groups. By substantially free of aromatic moieties is meant that the aliphatic diisocyanate (and thus the allyl-terminated aliphatic urethane component) contains 1 percent or less of aromatic diisocyanate groups. Examples of suitable diisocyanates include 1,6-hexamethylene diisocyanate, 1,4-tetramethylene diisocyanate and 1,10-decamethylene diisocyanate, 4,4'-methylenebis(cyclohexyl isocyanate), 4,4'-methylenebis(3-methyl cyclohexyl isocyanate), hydrogenated toluene diisocyanate (including hydrogenated products of: (a) the 2,4-isomer, (b) the 2,6-isomer, (c) the 80/20-2,4/2,6-isomer mixture and (d) the 65/35-2,4/2,6-isomer mixture), 4,4'-isopropylidene bis(cyclohexyl isocyanate), 1,4-cyclohexane diisocyanate, 4,4'-dicyclohexyl diisocyanate, 2,4'-dicyclohexyl diisocyanate, tetramethyl xylene diisocyanate, and 3-isocyanatomethyl-3,5,5-trimethylcyclohexane isocyanate. Preferably, the aliphatic diisocyanate is hydrogenated toluene diisocyanate or 3-isocyanatomethyl-3,5,5-trimethylcyclohexane isocyanate (isophorone diisocyanate).

As described, component A in the foregoing graphic expressions represents the residue, i.e., after removal of the terminal hydroxyl groups, of a saturated aliphatic polyol, e.g., diol, such as an alkane diol containing from 2 to 6, e.g., 2 to 4, carbon atoms, diethylene glycol, polyether diols, polycarbonate diols and polyester diols. Preferably, the aliphatic polyol from which the component A originates is a liquid at room temperature and is a polyester diol or alkane diol.

Polyester diols may be prepared by techniques well-known in the art, e.g., using saturated dicarboxylic acids or anhydrides thereof (or combination of acids and anhydrides) and polyhydric alcohols, or by ring opening of caprolactones, e.g., epsilon caprolactone, with a straight chain glycol, e.g., diethylene glycol. Such polyester diols and their manner of preparation are well known and are fully described in the published literature. Many are commercially available in various molecular weights. Aliphatic dicarboxylic acids suitable for preparing polyesters are those containing from about 4 to about 14, preferably from about 6 to about 10, carbon atoms inclusive. Examples of such dicarboxylic acids include: succinic acid, glutaric acid, adipic acid, pimelic acid, suberic acid, azelaic acid and sebacic acid. Corresponding anhydrides can also be used. Typically, adipic and azelaic acids are used.

The polyhydric alcohols used in the preparation of polyester diols are typically aliphatic alcohols containing at least 2 hydroxy groups, e.g., straight chain glycols containing from 2 to 15, preferably from 4 to 8, carbon atoms inclusive. More preferably, the aliphatic alcohols contain only 2 hydroxy groups. The glycols contain hydroxyl groups preferably in the terminal positions. Examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In preparing the polyester diol, the dicarboxylic acid (or anhydride thereof) is reacted with the polyhydric alcohol usually in the presence of a small amount of esterification catalyst, such as a conventional organo tin catalyst. The amount of acid and alcohol used will vary and depend on the polyester molecular weight desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4-butylene sebacate) and poly(epsilon caprolactone). Polyester diols contemplated for use may have a molecular weight average molecular weight from about 400 to about 2000, e.g., from about 400 to 1000, based on hydroxyl end group analysis of the polymer.

Polycarbonate diols that may be used to prepare the aliphatic urethane component of the polyol (allyl carbonate) composition may have weight average molecular weights ranging from about 500 to about 5000, e.g., 550 to 3300, more particularly from 750 to 1500, as determined by hydroxyl end group analysis. Aliphatic polycarbonate diols are described in U.S. Pat. Nos. 3,248,414, 3,248,415, 3,248,416, 3,186,961, 3,215,668, 3,764,457 and 4,160,853. Such hydroxy-terminated polycarbonates may be prepared from (1) carbon dioxide and 1,2-epoxides, (2) cyclic carbonates, such as ethylene carbonate, or (3) from cyclic carbonates and 1,2-epoxides by methods known in the art. Polycarbonate diols may also be prepared by reacting aliphatic diols with bischloroformates of aliphatic diols in the presence of inert solvents and acid acceptors, e.g., tertiary amines. In addition, polycarbonate diols may be prepared from glycols, such as ethylene glycol, propylene glycol and diethylene glycol, and dialkyl carbonates, such as diethyl carbonate and dimethyl carbonate, by a transesterification reaction.

In particular, U.S. Pat. No. 4,160,853 describes the synthesis of aliphatic polycarbonate diols by the reaction of an aliphatic diol and a dialkyl carbonate in the presence of a titanium catalyst. The reaction sequence may be depicted by the following equation:

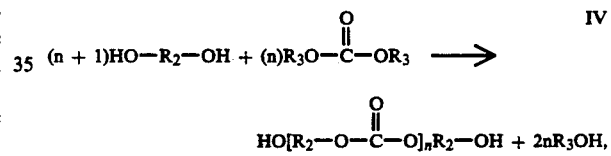

wherein n is a number from 4 to 46, $R_2$ is an aliphatic group (linear or cycloaliphatic) containing from 4 to about 10 carbon atoms, and $R_3$ is a lower alkyl group containing 1 to 4 carbon atoms. Preferred aliphatic diols include: 1,4-butane diol, and 1,6-hexane diol. Diethylcarbonate is a preferred dialkyl carbonate. The preferred catalysts are tetra-alkyl esters of titanium, particularly, tetrabutyl titanate. The disclosures of the aforedescribed patents relating to the preparation of aliphatic polycarbonate diols are hereby incorporated by reference.

Polyether diols, e.g., poly(oxyethylene)glycols, poly(oxy-1,2-propylene)glycols, and poly(oxy-1,4-butylene)glycol, that may be used to prepare the aliphatic urethane component of the polyol(allyl carbonate) composition may also vary in molecular weight. Poly(oxyethylene)glycols may range in molecular weight from about 200-4000, more particularly, 750-3300, e.g., 1000-2800. Liquid poly(oxyethylene)glycols having molecular weights of below about 750, as determined by hydroxyl end group analysis, are particularly contemplated. Poly(oxyethylene)glycols may be prepared by reaction of ethylene oxide with water or ethylene glycol in the presence of a catalytic amount of a Lewis acid at 50°-70° C. or Lewis base at 120°-200° C.

Poly(oxypropylene)glycols may be prepared in a manner similar to poly(oxyethylene)glycols. Molecular weights of the poly(oxypropylene) glycols that may be used to prepare the aliphatic urethane of the polyol(allyl carbonate) composition may vary from about 400 to about 4000, e.g., 400 to about 2000, or 400 to about 1200, as determined by hydroxyl end group analysis. Liquid poly(oxypropylene)glycols are particularly contemplated.

In addition, block and random hydroxyl terminated copolymers of ethylene oxide and propylene oxide may be used. Further, polyether diols prepared from 1,2-butylene oxide, i.e., poly(oxy-1,2-butylene)glycol, and tetrahydrofuran are also contemplated.

Alkane diols contemplated for use in preparing the aliphatic urethane component of the polyol(allyl carbonate) composition are alkane diols containing from 6 carbon atoms, e.g., ethylene glycol, propylene glycol, 1,4-butane diol, 1,5-pentane diol and 1,6-hexane diol. Preferably, the alkane diols contain terminal hydroxy groups.

The aliphatic urethane used to prepare the polyol(allyl carbonate) compositions of the present invention may be prepared by methods derived from those described in the literature. For example, the aliphatic diisocyanate, e.g., isophorone diisocyanate, may be reacted with allyl alcohol at from 30°-60° C., e.g., 50°-60° C., in the presence of a conventional organo tin catalyst, e.g., dibutyl tin dilaurate, to form as a principal product the monoallyl alcohol substituted aliphatic diisocyanate. Thereafter, two moles of the monoallyl alcohol substituted aliphatic diisocyanate are reacted with saturated aliphatic diol, e.g., polyester diol and/or alkane diol, at about 60°-70° C. in the presence of the organo tin catalyst to form the allyl-terminated aliphatic urethane(s). As used herein, the phrase "containing terminal allyl unsaturation" with respect to the aliphatic urethane means that each terminal end of the urethane contains a functional group containing allyl unsaturation.

Aliphatic urethanes containing acrylyl unsaturation in the terminal group may be prepared in a manner analogous to that described for the allyl-terminated aliphatic urethane, e.g., by substituting a material containing the acrylyl functional group for allyl alcohol. Such a material may be 2-hydroxyethyl acrylate or 2-hydroxyethyl methacrylate. By reacting the monoallyl alcohol substituted aliphatic diisocyanate and the mono (2-hydroxyethyl acrylate) substituted diisocyanate (in whatever molar ratio desired for the end product mixture) with the saturated aliphatic diol, e.g., polyester diol and/or alkane diol, products containing both an allyl-containing terminal group and an acrylyl-containing terminal group may be obtained.

The aliphatic urethanes described herein may be prepared in any suitable organic solvent. In a preferred embodiment, the solvent is the polyol(allyl carbonate), e.g., diethylene glycol bis(allyl carbonate), with which the allyl-terminated aliphatic urethane is to be copolymerized.

When using the polyol(allyl carbonate) monomer as the reaction medium, the aliphatic urethanes may comprise from 10 to 70 percent of the product removed from the reaction vessel. If the aliphatic urethanes comprise an amount greater than the 10 to 30 weight percent desired for the polymerizable compositions described herein, the reaction product can be diluted with additional polyol(allyl carbonate) until the composition concentration desired is obtained.

The mixture of aliphatic urethanes used to prepare the polyol (allyl carbonate) compositions of the present invention may be prepared simultaneously in one reaction vessel as a single reaction product mixture, as described hereinbefore. Alternatively, each aliphatic urethane used in the mixture may be prepared separately and then each blended (or diluted) with the polyol(allyl carbonate) monomer in the required proportions to obtain the desired composition. When prepared simultaneously, the mono-substituted aliphatic diisocyanate(s) is prepared as hereinbefore described and to this material is added (1) a blend of the aliphatic polyol(diol) reactants, i.e., the reactants forming the residue of the "A" moiety in the expression III-1, in the desired mole ratio proportions, e.g., the polyester diol and alkane diol, or (2) the dissimilar aliphatic diols added sequentially. Preferably, the aliphatic diol that represents the larger amount of the two diols is added first. For example, when the aliphatic polyols used are a polyester diol., e.g., poly(caprolactone) diol and an alkane diol, e.g., butane diol, and the molar amount of the polyester diol is larger than the alkane diol, e.g., the mole ratio of the polyester diol to the alkane diol is 9:1, the polyester diol is added first to the mono-substituted aliphatic diisocyanate followed by the alkane diol.

Aliphatic urethanes containing terminal bisallyl-, monoallyl/monoacrylyl, and bisacrylyl functional groups may be further depicted by the following graphic formulae:

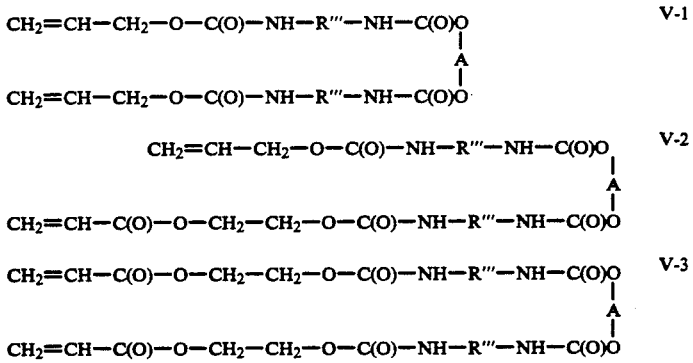

wherein A is the residue of the aliphatic polyol, e.g., polyester diol or alkane diol, and R'" is the hydrocarbon portion of the aliphatic diisocyanate. By selecting A and R'" from the examples described hereinbefore, the aliphatic urethane can be varied to provide different allyl-/acrylyl-terminated aliphatic urethanes.

Polymerization of the polyol(allyl carbonate) composition may be accomplished by adding to the composition an initiating amount of material capable of generating free radicals, such as organic peroxy compounds. Methods for polymerizing polyol(allyl carbonate) compositions are well known to the skilled artisan and any of those well known techniques may be used to polymerize the aforedescribed polymerizable composition. Suitable examples of organic peroxy compounds include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting resin polymerizate, such as diisopropyl peroxydicarbonate.

The amount of initiator used to initiate and polymerize the polyol(allyl carbonate) composition may vary and will depend on the particular initiator used, the make-up of the composition, e.g., the amount of allyl and acrylyl-functional groups present, and the degree of cure. Only that amount that is required to initiate and sustain the polymerization reaction is required, i.e., an initiating amount. With respect to the preferred peroxy compound, diisopropyl peroxydicarbonate, typically between about 2.4 and about 3.5 parts of that initiator per 100 parts of the polymerizable composition (phm) may be used. More usually, between about 2.75 and about 3.25 parts of that initiator per 100 parts of polymerizable composition is used to initiate the polymerization. The amount of initiator and the consequent cure cycle should be adequate to produce a polymerizate having a 15 second Barcol hardness of at least 10, preferably, at least 14, e.g., 10 to 35. Typically, the cure cycle involves heating the polymerizable composition in the presence of the initiator from room temperature or 45° C. to about 95°-105° C. over a period of about 17-21 hours. The surface of the cured matrix should not be so hard that, in one embodiment, imbibition of photochromic substances into the matrix by immersion or thermal transfer is inhibited or prevented if that method of incorporating the photochromic substance is used. In one embodiment, the polymerizate is slightly undercured to enhance permeation of the photochromic substance.

Various additives may be incorporated with the polymerizable polyol(allyl carbonate) composition. Such additives may include light stabilizers, heat stabilizers and ultraviolet light absorbers. In addition, it is contemplated that a form of photochromic substance resistant to the effects of the peroxy-type initiator may also be added to the polymerizable resin composition. Such photochromic substances include photochromic pigments and photochromic compounds encapsulated in metal oxides, the latter of which is such as described in U.S. Pat. No. 4,166,043 and 4,367,170.

In addition it is contemplated that from about 0.1 to about 0.5, e.g., 0.1 to 0.4, weight percent, based on the weight of the copolymerizable mixture, of a dialkyl pyrocarbonate may be added to the polymerizable composition. Such dialkyl pyrocarbonates may be represented by the graphic formula, $R''$—O—C(O)—O—C(O)—O—$R''$, wherein $R''$ is selected from the group consisting of $C_1$-$C_{12}$ alkyl and $C_6$-$C_{10}$ cycloalkyl. Preferably, $R''$ is a lower alkyl, e.g., $C_1$-$C_4$ alkyl, such as ethyl. Diethylpyrocarbonate is economically preferred. The use of dialkyl pyrocarbonates to inhibit yellowing of castings of polyol(allyl carbonate) compositions is described in copending U.S. patent application Ser. No. 07/347,539, filed May 4, 1989, the description of which dialkyl pyrocarbonates is hereby incorporated herein in toto by reference.

The synthetic organic polymerizate obtained by polymerization of the polyol(allyl carbonate) composition will preferably be transparent or optically clear so that it may be used for optical lenses, such as plano and ophthalmic lenses, windows, automotive transparencies, e.g., windshields, T-roofs, sidelights and backlights, and for aircraft transparencies, etc. The polymerizate also should be transparent to that portion of the electromagnetic spectrum which activates photochromic substance(s) that may be incorporated in the matrix, i.e., that wavelength of ultraviolet (UV) light that produces the colored or open form of a photochromic substance and that portion of the visible spectrum that includes the absorption maximum wavelength of the photochromic substance in its UV activated form, i.e., the open form.

Since the polymerizable polyol(allyl carbonate) composition comprises from about 70 to 90 weight percent polyol(allyl carbonate) the physical properties of the cured (polymerized) material of the present invention are similar to those obtained for homopolymers of the polyol(allyl carbonate) monomer, e.g., diethylene glycol bis(allyl carbonate). For optical applications, such properties include relatively low yellowness, low haze, adequate impact strength and hardness, suitable abrasion resistance for polymerizates of polyol(allyl carbonate), dyeability and organic solvent resistance. Such physical properties are described in "The Handbook of Plastic Optics", second edition, U.S. Precision Lens, Inc., Cincinnati, Ohio, 1983, which is incorporated herein by reference.

Photochromic articles described herein may be obtained by incorporating in or applying to the aforedescribed synthetic organic solid polymerizate (host material) at least one organic photochromic compound or compositions containing at least one organic photochromic compound (hereinafter collectively referred to as "photochromic substance(s)"). Incorporation or application of a photochromic substance to the host material may be accomplished by various methods described in the art. Such methods include dissolving or dispersing the photochromic substance within the plastic host, e.g., imbibition of the photochromic substance into the plastic host by immersion in a hot solution of the substance or by thermal transfer; providing the photochromic substance as a separate layer between adjacent layers of the host material, e.g., as part of a polymer film; and applying the photochromic substance as part of a coating placed on the surface of the host. The term "imbibition" or "imbibe" is intended to mean and include permeation of the photochromic substance alone into the subsurface of the synthetic plastic host material, solvent assisted transfer absorption of the photochromic substance into the polymerizate, vapor phase transfer and other such transfer mechanisms. The thermal transfer of photochromic substances into a transparent plastic host material is known to the skilled artisan and is described in the literature. See for example, U.S. Pat. Nos. 4,286,957 and 4,880,667, and copending U.S. patent application Ser. No. 07/490,029, filed Mar. 7, 1990, which are incorporated herein in toto by reference.

The amount of photochromic substance(s) incorporated into the synthetic plastic host may vary and will depend on the method of incorporation. Typically, a sufficient amount, i.e., a "photochromic amount", of the photochromic substance(s) is used so that the resulting article is photochromic, i.e., produces a photochromic effect. By "photochromic" or "photochromic effect" is meant that when the photochromic-containing article is exposed to ultraviolet light, the article visibly changes color (or becomes colored) and then returns to its original color or colorless state when the ultraviolet light is removed. The photochromic effect may be readily observed by exposing such a photochromic substance-containing article to a source of natural ultraviolet light, such as the sun, or to an artificial ultraviolet light source, such as a Spectroline Super ® Lamp, Model M ENF-28 (365 nanometers). Generally, the amount of photochromic substance(s) incorporated into the article may vary from about 0.01 to about 10 or 20 weight percent. More typically, the amount of photochromic substance(s) incorporated into the article may range from about 0.01 to about 2 weight percent, e.g., from about 0.05 to about 1 weight percent.

Photochromic substances that may be used to prepare the photochromic article of the present invention may be any suitable organic photochromic substance that provides a visual photochromic response when incorporated into the host material described herein; that are dispersible, e.g., soluble, within the host material, and that are chemically compatible with resin. Photochromic substances that may be used are varied. Particularly contemplated classes of photochromic compounds that may be used include: spiro(indolino)-type compounds, such as spiro(indolino)pyridobenzoxazines, spiro(indolino)naphthoxazines, spiro(benzindolino)pyridobenzoxazines, spiro(benzindolino)naphthoxazines, spiro(benzindolino)naphthopyrans, spiro(indolino)benzopyrans, spiro(indolino)naphthopyrans, spiro(indolino)quinopyrans, spiro(indolino)benzoxazines, chromenes, i.e., benzopyrans and 2H and 3H naphthopyrans, metal dithizonate compounds, fulgides or fulgimides and spiro(di)hydroindolizines.

The particular photochromic substance(s) selected for use will depend on its compatibility with the resin, including its solubility therein, and the particular change in color desired for the photochromic article. It is also contemplated that mixtures of two or more photochromic substances may be used.

Photochromic compounds that may be utilized to prepare photochromic articles of the present invention are for the most part described in the open literature and are the subject of various patent publications. For example, spiro(indolino)naphthoxazines have been described, among others, in U.S. Pat. Nos. 3,562,172, 3,578,602, 4,215,010 and 4,342,668. Spiro(indolino)pyrido benzoxazines are described in U.S. Pat. No. 4,637,698. Spiro(benzindolino)pyridobenzoxazines and spiro(benzindolino)-naphthoxazines are described in U.S. Pat. No. 4,931,218. Spiro(benzindolino)-naphthopyrans are described in Japanese patent publication 62/195383 and are represented by graphic formula VI

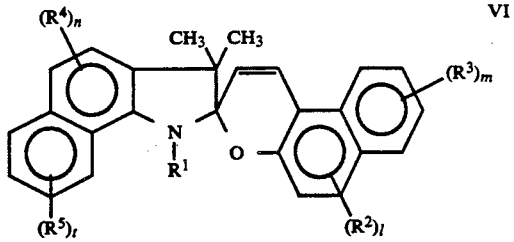

wherein $R^2$, $R^3$, $R^4$ and $R^5$ are alkyl groups having 1–4 carbons. halogen-substituted alkyl groups having 1 or 2 carbons, alkoxy groups having 1–4 carbons, halogen groups, or nitro group, 1 and n are integers of 0–2, m and t are integers of 0–4, and wherein $R^2$, $R^3$, $R^4$ and $R^5$ may be identical or different; $R^1$ represents an unsubstituted or substituted alkyl group having 1–20 carbons, unsubstituted or substituted cycloalkyl group have 3–10 carbons, an unsubstituted or substituted aralkyl group having 7–20 carbons, or an unsubstituted or substituted aryl group having 6–14 carbons.

Spiro(indolino)benzoxazines are described in U.S. Pat. No. 4,816,584. Spiro(indolino)benzopyrans, spiro(indolino)-naphthopyrans and spiro(indolino)quinopyrans are described, for example, in U.S. Pat. No. 4,880,667. Spiropyrans are also described in the text, *Techniques of Chemistry*. Volume III Photochromism, Chapter 3, Glenn H. Brown, Editor, John Wiley and Sons, Inc. New York 1971.

Photochromic organo-metal dithizonates, i.e., (arylazo)-thioformic arylhydrazidates, e.g., mercury dithizonates, are described in, for example, U.S. Pat. No. 3,361,706. Fulgides and fulgimides, e.g. the 3-furyl and 3-thienyl fulgides and fulgimides are described in U.S. Pat. No. 4,220,708. 3-pyrryl fulgides and fulgimides are described in U.S. Pat. No. 4,737,449. Spiro(di)hydroindolizines are described, for example, in U.S. Pat. No. 4.931,220 at column 20, line 5 through column 21, line 38. Certain chromenes, i.e., benzopyrans and naphthopyrans, are described in U.S. Pat. Nos. 3,567,605, 4,826,977 and 4,980,089 and in copending U.S. patent applications Ser. Nos. 07/490,031 filed Mar. 7, 1990, 07/557,432 filed Sep. 23, 1990 and 07/624,816 filed Dec. 3, 1990.

Those portions of the aforementioned identified patent publications and applications that describe the various photochromic compounds generically and specifically are hereby incorporated in toto by reference. In particular, column 8, line 52, through column 22, line 40 of U.S. Pat. No. 4,931,220 which describes specific spiro(indolino)-type photochromic compounds and other photochromic compounds and the disclosure relating thereto is incorporated herein in toto by reference.

The present invention is more particularly described in the following examples, which are intended as illustrative only, since numerous modifications and variations therein will be apparent to those skilled in the art.

EXAMPLE 1

Diethylene glycol bis(allyl carbonate) (1349.5 g, 4.9 mole), isophorone diisocyanate (1111.5 g, 5 moles), and dibutyl tin dilaurate (0.5 g) were charged to a 5 liter, jacketed, 4-necked flask equipped with mechanical stirrer, addition funnel, thermometer, nitrogen purge and water/ethylene glycol temperature bath. The contents of the reaction flask were heated to 50° C. with rapid agitation and a moderate nitrogen purge for 45 minutes. The nitrogen purge was reduced and a mixture of allyl alcohol (274.6 g, 4.7 moles) and 2-hydroxyethyl methacrylate (34.4 g, 0.3 mole) was added to the reaction flask over a period of two hours. An exotherm to 56° C. was observed. The reaction mixture was allowed to cool overnight. Thereafter, the reaction mixture was heated to 57° C. for one hour. Subsequently, about 1145 grams of a mixture of 80 mole percent poly(caprolactone) diol (about 530 molecular weight) and 20 mole percent 1,4-butane diol was charged to the reaction flask over 5 hours at a temperature of 60–61° C. The reaction was continued for an additional 45 minutes and then the reaction mixture allowed to cool overnight. In the morning, the temperature of the flask was increased to 60° C. and the product drained from the reaction flask. The product was a 65 weight percent solution of aliphatic urethanes derived from polycaprolactone diol and butane diol in diethylene glycol bis(allyl carbonate).

The reaction product was a very light straw color. The aliphatic urethane portion of the product was calculated to comprise about 71.6 mole percent of bis(allyl-terminated) urethane based on the poly(caprolactone) diol, about 8.4 mole percent of monoallyl-terminated, monomethacrylyl-terminated urethane based on the poly(caprolactone) diol, about 17.9 mole percent of bis(allyl-terminated) urethane based on 1,4-butane diol, and about 2.1 mole percent of monoallyl-terminated, monomethacryl-terminated urethane based on 1,4-butane diol. Dilution of the product with diethylene glycol bis(allyl carbonate) to an aliphatic urethane concentration of 16.64 weight percent gave a clear product having a very slight yellow tinge, a Brookfield viscosity of 57.4 centipoises at 25° C., and a Yellowness Index (through 5 centimeters) of 2.76, as measured by a Hunterlab Tristimulus Colorimeter, Model D25A-9.

EXAMPLE 2

Following the procedure and using the equipment of Example 1 diethylene glycol bis(allyl carbonate) (1224.8 g, 4.5 mole), isophorone diisocyanate (1111.5 g, 5 moles), butylated hydroxy toluene (0.75 g), and dibutyl tin dilaurate (0.8 g) were added to the reaction flask and heated to 50° C. with rapid agitation. A mixture of allyl alcohol (159.8 g, 2.7 moles) and 2-hydroxyethyl acrylate (261.2 g, 2.2 moles) was then charged to the flask over a period of 2 hours. An exotherm to 56° C. was observed. Thereafter, the reaction mixture was heated to 60° C. for one hour, and poly(caprolactone) diol (1325 g) (about 530 molecular weight) was added to the reaction flask over 5 hours - with an exotherm to 62° C. being observed. The resultant reaction mixture was maintained at 60° C. for one hour and then at 70° C. for 4 hours. The product was drained from the reaction flask. The product was a 70 percent solution of aliphatic urethanes in diethylene glycol bis(allyl carbonate).

The reaction product was a light straw color. (Yellowness Index (through 5 cm) of 8.74. The aliphatic urethane portion of the product was calculated to comprise about 30.3 mole percent of bis(allyl-terminated) urethane based on the poly(caprolactone) diol, about 20.2 mole percent of the bis(acrylyl-terminated) urethane based on the poly(caprolactone) diol, and about 49.5 mole percent of the monoallyl-terminated, monoacrylyl-terminated urethane based on the poly(caprolactone) diol. Dilution of product with diethylene glycol bis(allyl carbonate) to an aliphatic urethane concentration of 19.0 weight percent gave a product having a Brookfield viscosity at 25° C. of 64.4 centipoises and a Yellowness Index (through 5 cm) of 2.53.

EXAMPLE 3

Following the procedure described in Example 1, a 65 weight percent solution of aliphatic urethane derived from poly(caprolactone) diol (about 530 molecular weight) and 1,4-butane diol in diethylene glycol bis(allyl carbonate) was prepared in a 3-liter reactor equipped like the 5-liter reactor of Example 1. The ingredients used were diethylene glycol bis(allyl carbonate) (539.8 g, 1.9 mole), isophorone diisocyanate (444.6 g. 2 mole), dibutyl tin dilaurate (0.2 g ), allyl alcohol (104.6 g, 1.8 mole), 2-hydroxyethyl methacrylate (26.2 g, 0.2 mole), and a mixture of 80 mole percent poly(caprolactone) diol and 20 mole percent 1,4-butane diol (442 g). The mixture of allyl alcohol and 2-hydroxyethyl methacrylate was added over 75 minutes to the reactor containing the diethylene glycol bis(allyl carbonate), the diisocyanate and catalyst at 45° C. An exotherm to 56° C. was observed. The reaction mixture was then heated at 61° C. for 45 minutes and the poly(caprolactone) diol/butane diol mixture added over 3 hours and 45 minutes with an exotherm to 63° C. observed. The reaction was continued for 1 hour at 60° C. and then at 70° C. for 2 hours. The product was then drained from the reactor.

The product was straw colored. When diluted with further diethylene glycol bis(allyl carbonate) to a 16.6 weight percent aliphatic urethane concentration, the diluted product had a Brookfield viscosity at 25° C. of 77.5 centipoises and a Yellowness Index (through 5 cm) of 5.93. The aliphatic urethane portion of the product was calculated to comprise about 69.6 mole percent bis(allyl-terminated)-, 16.3 mole percent monoallyl/-monomethacrylyl-terminated-, and 1.0 mole percent bis(methacrylyl-terminated)-urethanes based on the poly(caprolactone) diol, and about 10.5 mole percent bis(allyl-terminated)-, 2.5 mole percent monoallyl/-monoacrylyl-terminated-, and 0.1 mole percent bis(methacrylyl-terminated)-urethanes based on 1,4-butane diol.

EXAMPLE 4

In the manner described in Example 2, a 70 weight percent solution of aliphatic urethane derived from poly(caprolactone) diol (about 530 molecular weight) in diethylene glycol bis(allyl carbonate) was prepared in a 3-liter reactor equipped like the 5-liter reactor of Example 1. The ingredients used were diethylene glycol bis-(allyl carbonate) (468.3 g, 1.65 mole), isophorone diisocyanate (444.6 g, 2.0 mole), dibutyl tin dilaurate (0.2 g), a mixture of allyl alcohol (109.8 g, 1.89 mole) and 2-hydroxyethyl methacrylate (13.8 g, 0.11 mole), and poly(caprolactone) diol (530 g, 1.0 mole). The mixture of allyl alcohol and 2-hydroxyethyl methacrylate was added over 2 hours to the reactor containing the diethylene glycol bis(allyl carbonate), the diisocyanate and catalyst at 45° C. An exotherm to 52° C. was observed. The reaction mixture was then heated at 60° C. for 20 minutes and the poly(caprolactone) diol added to the reactor over 4½ hours. No exotherm was observed. The reaction was continued for 1 hour at 60° C. and for 2 hours at 70° C. The product was drained from the reactor.

The product was light straw colored and had a Yellowness Index (through 5 cm) of 5.85. When diluted with further diethylene glycol bis(allyl carbonate) to a 18.1 weight percent aliphatic urethane concentration, the diluted product had a Brookfield viscosity at 25° C. of 89.5 centipoises and a Yellowness Index (through 5 cm) of 2.20. The aliphatic portion of the product was calculated to comprise about 89.8 mole percent bis(allyl-terminated)-, 10.0 mole percent monoallyl/monomethacrylyl-terminated-, and 0.2 mole percent bis(methacrylyl-terminated)-urethanes based on poly(caprolactone) diol.

EXAMPLE 5

To a 3-liter reactor equipped like the 5-liter reactor described in Example 1 and containing diethylene glycol bis(allyl carbonate) (498.5 g, 1.8 moles), isophorone diisocyanate (444.6 g, 2.0 moles), 4-methoxy phenol (0.8 g) and dibutyl tin dilaurate (0.2 g) at 50° C., was added over about 2 hours a mixture of allyl alcohol (58.1 g, 1.0 mole) and 2-hydroxyethyl methacrylate (131.0 g, 1.0 mole). An exotherm to 54° C. was observed. Thereafter, the reaction mixture was heated at 60° C. for about 45 minutes and the poly(caprolactone) diol (527 g, 1.0 mole) (about 530 molecular weight) added to the reactor over about 3 hours. No exotherm was observed. The reaction mixture was cooled and allowed to set overnight. The reaction mixture was reheated to 70° C. for 2 hours and 4 drops of dibutyl tin dilaurate were added to aid the reaction. Heating was continued for an additional 4 hours 15 minutes. The reaction product was then drained from the reactor. The product was a 70 weight percent solution of aliphatic urethane derived from the poly(caprolactone) diol in diethylene glycol bis(allyl carbonate).

The reaction product was straw colored and had a Yellowness Index (through 5 cm) of 14.23. The aliphatic portion of the product was calculated to comprise about 25.0 mole percent bis(allyl-terminated)-, 50.0 mole percent monoallyl/monomethacrylyl-terminated-, and 25.0 mole percent bis(methacrylyl-terminated)-urethanes based on the poly(caprolactone) diol. When diluted with further diethylene glycol bis(allyl carbonate) to a 19.3 weight percent aliphatic urethane concentration, the diluted product had a Brookfield viscosity at 25° C. of 89.5 centipoises and a Yellowness Index (through 5 cm) of 4.58.

EXAMPLE 6

A polyol(allyl carbonate) polymerizable composition comprising about 99.7 weight percent of the diluted product of Example 1 and about 0.3 weight percent diethyl pyrocarbonate was prepared by adding the pyrocarbonate to the diluted product. This composition was initiated with 2.70 phm of diisopropyl peroxydicarbonate and cast into 6×6×0.25 inch (15×15×0.6 cm) sheets using a mold prepared from two flat glass plates separated by a gasket. The polymerizable composition was cured anaerobically by heating the composition slowly from about 44° C. to 105° C. over 17 hours. The cured sheet had a 15 second Barcol hardness of 13 (as measured at 23° C. with a Barcol Impressor Model GYZJ 934-1). The casting had the following L*, a* and b* color values, as measured by a Spectrogard ® II Color System Spectrophotometer, 97.1, 0.0 and 0.4 respectively. These values show that the casting was nearly colorless. The percent light transmission of the casting, (Y) was 92.6 percent.

EXAMPLE 7

A polyol(allyl carbonate) polymerizable composition comprising about 83.0 weight percent diethylene glycol bis (allyl carbonate), 14.5 weight percent of bis(allyl-terminated) aliphatic urethane prepared from poly(caprolactone) diol having a molecular weight of about 530 and isophorone diisocyanate, 2.2 weight percent of bis(allyl-terminated) aliphatic urethane prepared from 1,4-butane diol and isophorone diisocyanate, and 0.30 weight percent diethyl pyrocarbonate was prepared. This monomer composition was initiated with 2.70 phm of diisopropyl peroxydicarbonate (IPP), and the composition of Example 6, which was also initiated with 2.70 phm IPP, were each used to produce five 2-base 11 millimeter edge thick semi-finished lens blanks in a water bath. The lenses were cured by heating the molds slowly from about 44° C. to 95° C. over 17 hours. The molds were then allowed to cool to 80° C. in the bath before being removed. The lens blanks were then demolded at 40°-50° C. Two of the lenses cast using the monomer composition described in this Example 7 pre-released, i.e., the casting had released from the mold sometime during the curing cycle and prior to demolding. Pre-release results in a permanent defect in the surface of the lens which cannot be repaired. Such pre-released lenses must be discarded. In contrast, none of the lenses prepared using the monomer composition of Example 6 pre-released. Two lenses from each monomer composition were imbibed with a photochromic dye and all showed good photochromic activity under ultraviolet light.

EXAMPLE 8

A polymerizable monomer composition comprising the diluted product of Example 2 and 0.3 weight percent diethyl pyrocarbonate was prepared. This composition was initiated with 2.60 phm of diisopropyl peroxydicarbonate and used to prepare ten 2-base 11 millimeter edge thick semi-finished lens blanks by the casting procedure described in Example 7. None of the lens blanks prepared from this monomer composition pre-released.

EXAMPLE 9

The monomer composition of Example 8 was initiated with 2.70 phm diisopropyl peroxydicarbonate and cast into 6×6×0.25 inch (15×15×0.6 cm) sheets in accordance with the procedure described in Example 6. The cast sheet had a 15 second Barcol Hardness of 12. The L*, a* and b* color values for the casting were 97.1, −0.1 and 0.5 respectively. The percent transmission (Y) was 92.6 percent. The foregoing color values show that the casting was nearly colorless.

EXAMPLE 10

A polyol(allyl carbonate) composition was prepared from a mixture of 20 weight percent of Uvithane ® 893 urethane diacrylate, 79.9 weight percent diethylene glycol bis(allyl carbonate) and 0.1 weight percent of diethyl pyrocarbonate. This composition was initiated with 2.25 phm IPP and cast into 2-base 11 millimeter edge thick semi-finished lens blanks using the same cure cycle as described in Example 7. Three of these lenses and three lenses from Example 8 were imbibed simultaneously with an identical photochromic dye material using a thermal transfer method. The lenses were measured for photochromic response at 72° F. (22° C.) and 95° F. (35° C.), which data is tabulated in Table I.

TABLE I

| Lens # Example Lens | Net Abs.[1] at 346 nm | $\Delta OD$[2] | | |
|---|---|---|---|---|
| | | 0.5 min | 2 min | 10 min |
| | | 72° F. (22° C.) | | |
| 10-1 | 2.00 | 0.066 | 0.172 | 0.303 |
| 10-2 | 2.00 | 0.068 | 0.177 | 0.318 |
| 10-3 | 2.06 | 0.068 | 0.178 | 0.318 |
| 8-1 | 1.99 | 0.088 | 0.225 | 0.384 |
| 8-2 | 2.01 | 0.085 | 0.218 | 0.369 |
| 8-3 | 2.02 | 0.088 | 0.225 | 0.381 |
| | | 95° F. (35° C.) | | |
| 10-1 | | 0.058 | 0.095 | 0.115 |
| 10-2 | | 0.057 | 0.095 | 0.111 |
| 10-3 | | 0.058 | 0.098 | 0.119 |
| 8-1 | | 0.073 | 0.115 | 0.133 |
| 8-2 | | 0.070 | 0.115 | 0.131 |
| 8-3 | | 0.071 | 0.115 | 0.133 |

[1] Net absorbance
[2] The change in Optical Density [Log (100/% Transmittance)], i.e., the change equal to the activated (or partially activated) OD of the lens minus the OD of the unactivated lens. Activated OD is measured after illumination with a 200 watt Xenon ultraviolet light for 0.5, 2 and 10 minutes.

The data of Table I show that all 6 lenses contained about the same amount of photochromic dye material—the Net Absorbance at 346 nanometers being about the same, i.e., about 2.00. (Net absorbance being the difference between the ultraviolet light absorbance at 346 nm of the photochromic-containing lens minus the ultraviolet light absorbance at 346 nm of the original cast lens.)

The data of Table I show also that the lenses of Example 8, i.e., lenses prepared from polyol(allyl carbonate) compositions of the present invention have an improved photochromic response over the lenses of Example 10—as illustrated by the higher $\Delta OD$ values—at each temperature and for each degree of activation.

Although the present invention has been described with reference to the specific details of particular embodiments thereof, it is not intended that such details be regarded as limitations upon the scope of the invention except insofar as to and to the extent that they are included in the accompanying claims.

What is claimed is:

1. A polymerizable organic composition comprising a copolymerizable blend of:
   (a) polyol(allyl carbonate), and
   (b) from about 10 to about 70 weight percent of a mixture of aliphatic urethanes, the terminal portions of which contain a functional group selected from the group consisting of allyl and acrylyl groups, said mixture of aliphatic urethanes being representable by at least two of the expressions, (1) D—B—A—B—D,
   (2) D—B—A—B—D' and
   (3) D'—B—A—B—D' wherein D represents the terminal portion containing the allyl group, D' represents the terminal portion containing the acrylyl group, B represents an aliphatic bis carbamic moiety representable by the formula, —OC(O)—NH(E)NH—C(O)—O—, wherein E is the aliphatic residue of an aliphatic diisocyanate, and A in each aliphatic urethane present in the mixture of aliphatic urethanes represents the residue of a saturated aliphatic diol selected from the group consisting of $C_2$-$C_6$ alkane diols, diethylene glycol, polyester diol, polyether diol or polycarbonate diol, the mole ratio of said allyl groups to acrylyl groups in the aliphatic urethanes present in the mixture being from about 15:1 to about 1:1.

2. The polymerizable composition of claim 1 wherein the polyol(allyl carbonate) is diethylene glycol bis(allyl carbonate) and the mixture of aliphatic urethanes is present in amounts of from about 10 to about 30 weight percent.

3. The polymerizable composition of claim 1 wherein A is the residue of a saturated polyester diol, having a molecular weight of from about 400 to about 1000, or $C_2$-$C_6$ alkane diol.

4. The polymerizable composition of claim 3 wherein the polyester diol is poly(caprolactone) diol.

5. The polymerizable composition of claim 3 wherein the alkane diol is 1,4-butane diol.

6. The polymerizable composition of claim 1 wherein the aliphatic diisocyanate is isophorone diisocyanate.

7. The polymerizable composition of claim 2 wherein A is the residue of a saturated polyester diol having a molecular weight of from about 400 to about 1000, or a $C_2$-$C_6$ alkane diol.

8. The polymerizable composition of claim 7 wherein the polyester diol is poly(caprolactone) diol, the alkane diol is 1,4-butane diol, and the aliphatic diisocyanate is isophorone diisocyanate.

9. The polymerizable composition of claim 8 wherein D is the allyl group and D' is the acrylyl group, $CH_2$=C(L)—C(O)—O—$CH_2$—$CH_2$—, wherein L is hydrogen or methyl.

10. The polymerizable composition of claim 1 wherein D is the allyl group and D' is the acrylyl group, $CH_2$=C(L)—C(O)—O—$CH_2$—$CH_2$—, wherein L is hydrogen or methyl.

11. The polymerizable composition of claim 3 wherein D is the allyl group, D' is the acrylyl group, $CH_2$=C(L)—C(O)—O—$CH_2$—$CH_2$—, wherein L is hydrogen or methyl, the polyester diol is poly(caprolactone) diol and the alkane diol is 1,4-butane diol.

12. The polymerizable composition of claim 2 wherein the mixture of aliphatic urethanes comprises a mixture of urethanes representable by the expressions, (1) D-B-A'-B-D,
(2) D-B-A"-B-D,
(3) D'-B-A'-B-D, and
(4) D'-B-A"-B-D wherein A' is a polyester diol and A" is a $C_2$-$C_6$ alkane diol.

13. The polymerizable composition of claim 12 wherein the polyester diol is poly(caprolactone) diol having a molecular weight of from about 400 to about 1000, and the alkane diol is 1,4-butane diol.

14. The polymerizable composition of claim 13 wherein D is the allyl group and D' is the acrylyl group, $CH_2$=C(L)—C(O)—O—$CH_2$—$CH_2$—, wherein L is hydrogen or methyl.

15. The polymerizable composition of claim 14 wherein the aliphatic diisocyanate is isophorone diisocyanate.

16. The polymerizable composition of claim 2 wherein the mixture of aliphatic urethanes comprises a mixture of urethanes representable by the expressions, (1) D-B-A'-B-D, -continued (2) D-B-A'-B-D', and
(3) D'-B-A'-B-D' wherein A' is a polyester diol.

17. The polymerizable composition of claim 16 wherein the polyester diol is poly(caprolactone) diol having a molecular weight of from about 400 to about 1000.

18. The polymerizable composition of claim 17 wherein D is the allyl group and D' is the acrylyl group, $CH_2=C(L)-C(O)-O-CH_2-CH_2-$, wherein L is hydrogen or methyl.

19. The polymerizable composition of claim 18 wherein the aliphatic diisocyanate is isophorone diisocyanate.

20. The polymerizable composition of claim 2 wherein the composition contains from about 0.1 to about 0.5 weight percent, based on the weight of the copolymerizable blend, of dialkyl pyrocarbonate representable by the formula, $R''-O-C(O)-O-C(O)-O-R''$, wherein $R''$ is selected from the group consisting of $C_1-C_{12}$ alkyl and $C_6-C_{10}$ cycloalkyl.

21. The polymerizable composition of claim 20 wherein the dialkyl pyrocarbonate is diethyl pyrocarbonate.

22. The polymerizable composition of claim 12 wherein the composition contains from about 0.1 to about 0.5 weight percent, based on the weight of the copolymerizable blend, of dialkyl pyrocarbonate representable by the formula, $R''-O-C(O)-O-C(O)-O-R''$, wherein $R''$ is selected from the group consisting of $C_1-C_{12}$ alkyl and $C_6-C_{10}$ cycloalkyl.

23. The polymerizable composition of claim 22 wherein the dialkyl pyrocarbonate is diethyl pyrocarbonate.

24. The polymerizable composition of claim 16 wherein the composition contains from about 0.1 to about 0.5 weight percent, based on the weight of the copolymerizable blend, of dialkyl pyrocarbonate representable by the formula, $R''-O-C(O)-O-C(O)-O-R''$, wherein $R''$ is selected from the group consisting of $C_1-C_{12}$ alkyl and $C_6-C_{10}$ cycloalkyl.

25. The polymerizable composition of claim 24 wherein the dialkyl pyrocarbonate is diethyl pyrocarbonate.

26. A solid organic resin prepared by polymerizing the composition of claim 2.

27. The solid organic resin of claim 26 which contains a photochromic amount of an organic photochromic substance selected from the group consisting of spiro(indolino)naphthoxazines, spiro(indolino)pyridobenzoxazines, spiro(indolino)benzoxazines, spiro(indolino)benzopyrans, spiro(indolino)naphthopyrans, chromenes, spiro(benzindolino)pyridobenzoxazines, spiro(benzindolino)-naphthoxazines, spiro(benzindolino)naphthopyrans, metal dithizonates, fulgides, fulgimides, spiro(di)hydroindolizines, and mixtures of such photochromic substances.

28. The solid organic resin of claim 27, wherein the photochromic substance is selected from the group consisting of spiro(indolino)naphthoxazines, spiro(indolino)pyridobenzoxazines, spiro(indolino)benzoxazines, chromenes and mixtures of such photochromic substances.

29. A solid organic resin prepared by polymerizing the composition of claim 12.

30. A solid organic resin prepared by polymerizing the composition of claim 16.

* * * * *